United States Patent

Kok et al.

[11] Patent Number: 5,906,261
[45] Date of Patent: May 25, 1999

[54] DEVICE FOR PROCESSING OBJECTS

[75] Inventors: Ronaldus J. Kok, Eindhoven; Johannes M. Mulder, Geldrop; Cornelis P. Du Pau, Eindhoven, all of Netherlands

[73] Assignee: ODME International B.V., Veldhoven, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/570,873

[22] Filed: Dec. 12, 1995

[30] Foreign Application Priority Data

Dec. 14, 1994 [NL] Netherlands ................ 94002117

[51] Int. Cl.$^6$ ................................................... B23B 13/00
[52] U.S. Cl. ................................... 198/339.1; 198/468.2; 414/744.3
[58] Field of Search ............................. 414/750, 744.3; 198/468.2, 468.4, 468.6, 339.1

[56] References Cited

U.S. PATENT DOCUMENTS

| 1,859,111 | 5/1932 | Rock . | |
|---|---|---|---|
| 2,915,200 | 12/1959 | Roeber | 198/468.2 X |
| 4,202,435 | 5/1980 | Mang et al. | 198/339.1 |
| 4,740,135 | 4/1988 | Shulenberger | 198/468.6 X |

FOREIGN PATENT DOCUMENTS

| 0 574 975 A1 | 12/1993 | European Pat. Off. . |
| 3709354 A1 | 9/1988 | Germany . |
| 2 168 447 | 6/1986 | United Kingdom . |

OTHER PUBLICATIONS

Netherlands Search Report, Aug. 17, 1995.

*Primary Examiner*—Donald W. Underwood
*Attorney, Agent, or Firm*—Pillsbury Madison & Sutro LLP

[57] ABSTRACT

The invention relates to a device for processing objects, said device being provided with a number of stations comprising supporting means for supporting objects in said stations, and with conveying means, by which the objects can be moved from one station to another station. A transport means, which is capable of rotating movement about a vertical axis of rotation and translating movement parallel to said axis of rotation, is fitted with gripping means for gripping and moving the objects between the various stations. The transport means is supported by at least three spaced-apart carriers, which are in turn supported by sliding pieces, which are journalled in such manner as to be capable of sliding movement in vertical direction. Two hinged-together links are provided between a sliding piece and the frame, one being hinged to the sliding piece, the other being hinged to the frame and both being hinged to a connecting rod which is movable in a plane extending transversely to the axis of rotation. The links are capable of pivoting movement between a position in which the two links include an angle with each other and a position in which the two links are at least substantially in line with said sliding piece.

9 Claims, 6 Drawing Sheets

DEVICE FOR PROCESSING OBJECTS

BACKGROUND OF THE INVENTION

1. Field of the Invention

The invention relates to a device for processing objects, said device being provided with a number of stations comprising supporting means for supporting objects in said stations, and with conveying means, by which the objects can be moved from one station to another station, whereby said conveying means are provided with a transport means being capable of rotating movement about a vertical axis of rotation and translating movement parallel to said axis of rotation, which transport means is fitted with gripping means for gripping and moving the objects between the various stations, and with driving means, by which said transport means can be reciprocated about its axis of rotation and be translated parallel to said axis of rotation so as to move said gripping means between said stations.

2. Description of the Prior Art

In such a device known from DE-A-37.09.354 the transport means is moved parallel to the axis of rotation by means of a piston which is movable in a cylinder. Since the axis of the cylinder coincides with the axis of rotation of the conveyor, the transport means can be tilted about a line extending transversely to the axis of rotation in a relatively simple manner. The consequence of such tilting is that the positioning accuracy of the transport means in the direction parallel to the axis of rotation is relatively small.

A device of this type is also known from U.S. Pat. No. 5,411,588. The contents of said U.S. Pat. No. 5,411,588 are considered to be incorporated herein by this reference and consequently it is not considered necessary to give a full description of the construction and operation of such a device herein.

As is set forth in said U.S. Pat. No. 5,411,588, the mechanism for reciprocating the transport means fitted with gripping means in horizontal and vertical direction comprises a cam mechanism, as well as three annular means, fitted with a wave-shaped guideway and followers cooperating therewith. In practice it has become apparent that this known construction is satisfactory per se, but that in some cases the fact that this known construction is comparatively heavy and that the various parts may take up a comparatively great amount of space in the device may constitute a drawback.

The object of the invention is to obtain a device of the above kind, which makes it possible to meet the above-described drawbacks when being used.

According to a first aspect of the invention this may be achieved in that said transport means is supported by at least three spaced-apart carriers in such manner as to be rotatable about its vertical axis of rotation, said carriers in turn being supported by sliding pieces, which are journalled in such manner as to be capable of sliding movement in vertical direction, whereby two hinged-together links are provided between a sliding piece and the frame, the first link being hinged to said sliding piece, the second link being hinged to said frame and both links being hinged to a connecting rod which is movable in a plane extending transversely to the axis of rotation, whilst said links are capable of pivoting movement between a position in which the two links include an angle with each other and a position in which the two links are at least substantially in line with said sliding piece.

This leads to a simple and compact mechanism for effecting the up-and-down movement of the transport means and the gripping means for the objects connected thereto, whereby the spaced-apart carriers provide a relatively rigid construction, which cannot be tilted.

It is noted that from GB-A-2.168.447 a device is known wherein a plate is movable in vertical direction by means of two pairs of hinged-together links. Since said links are connected to connecting rods which are movable in a plane extending parallel to the vertical direction, the number of pairs of links equals two at most. For supporting a plate or transport means firmly in one plane at least three spaced-apart supporting points are required, however. In the device according to the invention the carriers form said supporting points.

According to another aspect of the invention a crank connecting rod mechanism is connected to the transport means for reciprocating said transport means about its axis of rotation. Also this measure leads to a light and compact driving mechanism. It is preferred to connect the connecting rod to the transport means at a point located as far as possible from the axis of rotation, in order to obtain a relatively high positioning accuracy.

By using this construction a very light and simple mechanism for reciprocating the transport means can be obtained, in particular when a motor rotating in one direction, preferably an electromotor, is used for driving said crank connecting rod mechanism.

DESCRIPTION OF THE DRAWINGS

The invention will be explained in more detail hereafter with reference to the accompanying Figures, wherein the means for driving the transport means are diagrammatically illustrated.

DETAILED DESCRIPTION OF THE PREFERRED EMBODIMENT

Figure 2:
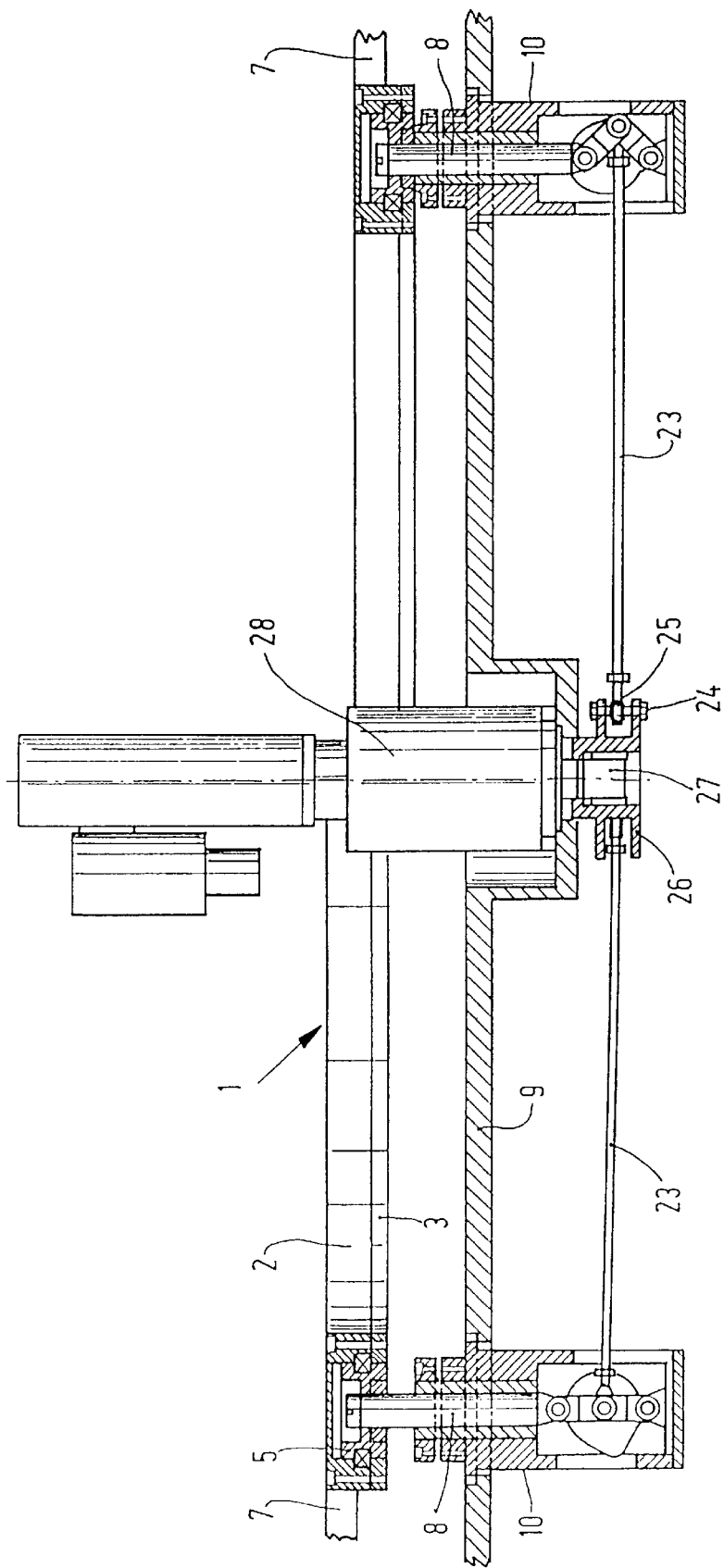
FIG. 2 is a sectional view of FIG. 1, seen along the line II—II in FIG. 1.

As is diagrammatically illustrated in the Figures, the device comprises an annular transport means 1, which is substantially built up of two annular means 2 and 3, one being supported on the other, which are interconnected by means of bolts 4. The transport means is thereby supported by an annular carrier 5, with the interposition of annular bearings 6, which are accommodated within grooves formed in the inner circumference and the outer circumference of the annular carrier 5, as well as in grooves bounded by the annular parts 2 and 3, as will be apparent from FIGS. 2, 4 and 5.

Gripping means for disc-shaped registration carriers may be connected, via connecting arms 7, to the annular transport means 1, all this as described in the aforesaid U.S. Pat. No. 5,411,588.

The annular carrier 5 having a substantially H-shaped section is supported by a plurality of sliding pieces 8 made up of plungers, which are journalled, in such manner as to be capable of vertical sliding movement, in sleeve-shaped means 10 secured to the frame 9 of the device. An internally threaded sleeve 11 is thereby screwed on the upper end of each plunger 8. At its bottom end said sleeve 11 is provided with a projecting collar 12, on which a web 14 of carrier 5 is supported with the interposition of bearings 13, said web 14 being provided with a bore 16, within which the upper end of plunger 8 is positioned. A nut 15 is screwed on that part of the, also externally threaded, sleeve 11 which projects above said web, which nut butts on the upper side of web 14, with the interposition of bearings 13, all this in such a manner that the plunger 8 is connected to the annular carrier 5 in such manner as to be incapable of movement in its longitudinal direction.

The upper end of a link 18 is hinged to the bottom end of each plunger 8 by means of a horizontally extending pin 17 crossing the central axis of the annular carrier 5 perpendicularly. The bottom end of the link 18 is connected to the upper end of a further link 20 by means of a pin 19 extending parallel to pin 17. The bottom end of link 20 is hinged, by means of a pin 21 extending parallel to pins 17 and 19, to an ear 22 which is fixedly connected to sleeve 10.

Furthermore the end of a connecting rod 23 is hinged to each pivot pin 19 by means of a ball joint. As is illustrated in particular in FIGS. 1–3, the facing ends of the four connecting rod 23 are connected to a disc-shaped means 26 by means of vertical pins 24, with the interposition of a ball joint 25. Said disc-shaped means 26 is secured to the outgoing shaft 27 of an electromotor 28, which is disposed in such a manner that the central axis of outgoing shaft 27 coincides with the central axis of annular carrier 5 and the axis of rotation of transport means 1.

Figure 1:
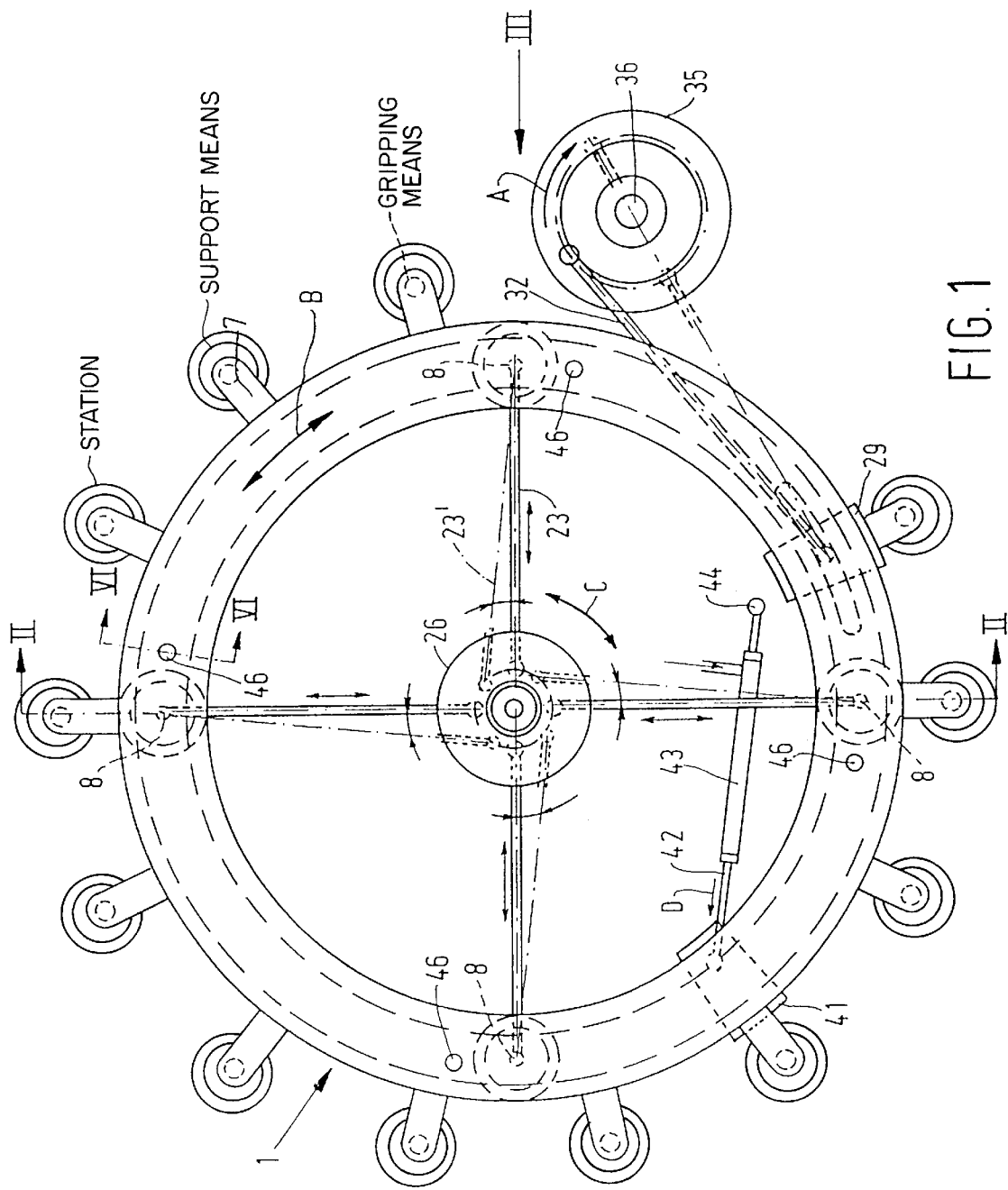
FIG. 1 is a diagrammatic plan view of a transport means, showing parts of gripping means connected thereto as well as parts of the means for driving the transport means.
Figure 3:
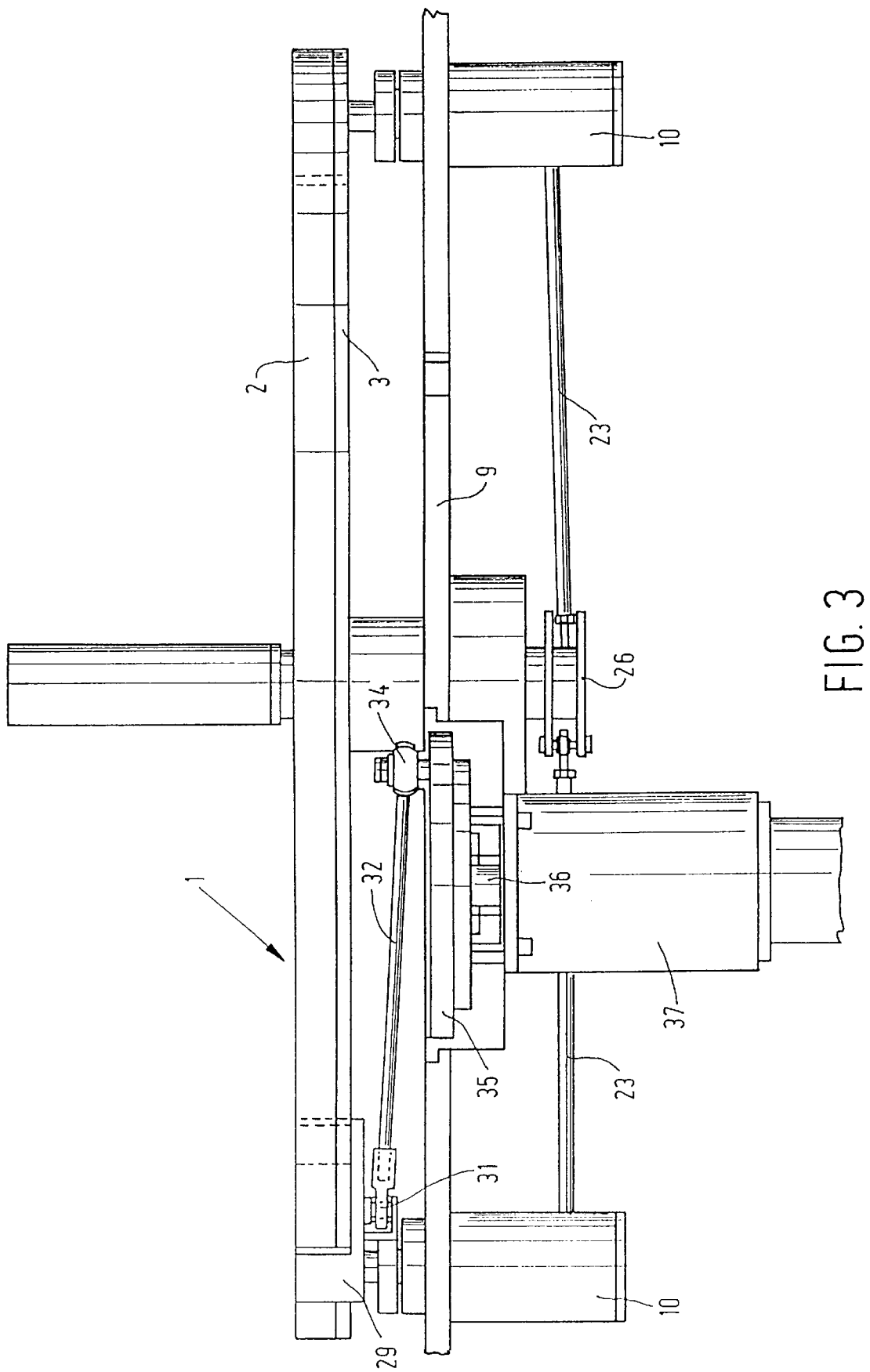
FIG. 3 is view of FIG. 1, seen according to arrow III in FIG. 1.

As is furthermore apparent in particular from FIGS. 1 and 3, the end of a connecting rod 32 is connected to a support 29 secured to transport means 1, utilizing a vertical pivot pin and a ball joint 31. The other end of the connecting rod is connected to a disc 35 by means of a vertical pin and a ball joint 34, said disc being secured to the vertical outgoing shaft 36 of an electromotor 37 mounted on the frame 9 of the device.

It will be apparent that when the motor 37 rotates in the direction according to arrow A (FIG. 1), the transport means 1 can be reciprocated about its axis of rotation, as indicated by means of arrow B. The motor 37 can thereby be made to rotate in steps in one and the same direction, as indicated by means of arrow A, so that, as explained in the aforesaid U.S. Pat. No. 5,411,588, each gripping means or the like connected to transport means 1 can be moved in a first direction from a particular position of rest (for example an intermediate position) to a particular processing station, and then be moved in opposite direction from said processing station to a neighbouring processing station, and subsequently back to the aforesaid position of rest.

Furthermore the disc-shaped means 26 can be reciprocated by means of electromotor 28, as indicated by means of arrow C. As a result of this connecting rods 23 can be pivoted from the position illustrated in full lines in FIG. 1 to position 23' illustrated in chain-dotted lines in FIG. 1, which results in lengthwise movement of connecting rods 23 in a direction away from sleeves 10. As a result of this links 18 and 20 will be pivoted from the position shown in FIG. 5, in which said links include an angle with each other, to the position shown in FIG. 4, in which the links are in line. As will be apparent from FIGS. 5 and 4, the annular carrier 5, and thus also the annular transport means 1, is lifted from a lower position to an upper position in order to lift objects supported by supporting means, in particular in the shape of registration carriers, from the supporting means supporting the registration carriers. After the registration carriers resting on supporting means have been moved to other processing stations, the connecting rods 23 can be moved in their longitudinal direction again by rotating the electromotor 28, as a result of which connecting rods 23 will return to the position illustrated in full lines in FIG. 1, and the links will be pivoted to the position shown in FIG. 5, as a result of which transport means 1 and the gripping means supported by said transport means are moved downward so as to place the registration carriers on the supporting means in the respective stations.

It will also be apparent that the drive of the disc-shaped means may also be designed such that the rods 23 can be pivoted in opposite directions from their positions shown in full lines, so that they cannot only be moved to position 23' but also to a similar position on the other side of position 23.

Furthermore it will be apparent that the rotations of the two electromotors will be synchronized in order to effect an even and controlled movement of the registration carriers from one processing station to a next processing station.

Figure 4:
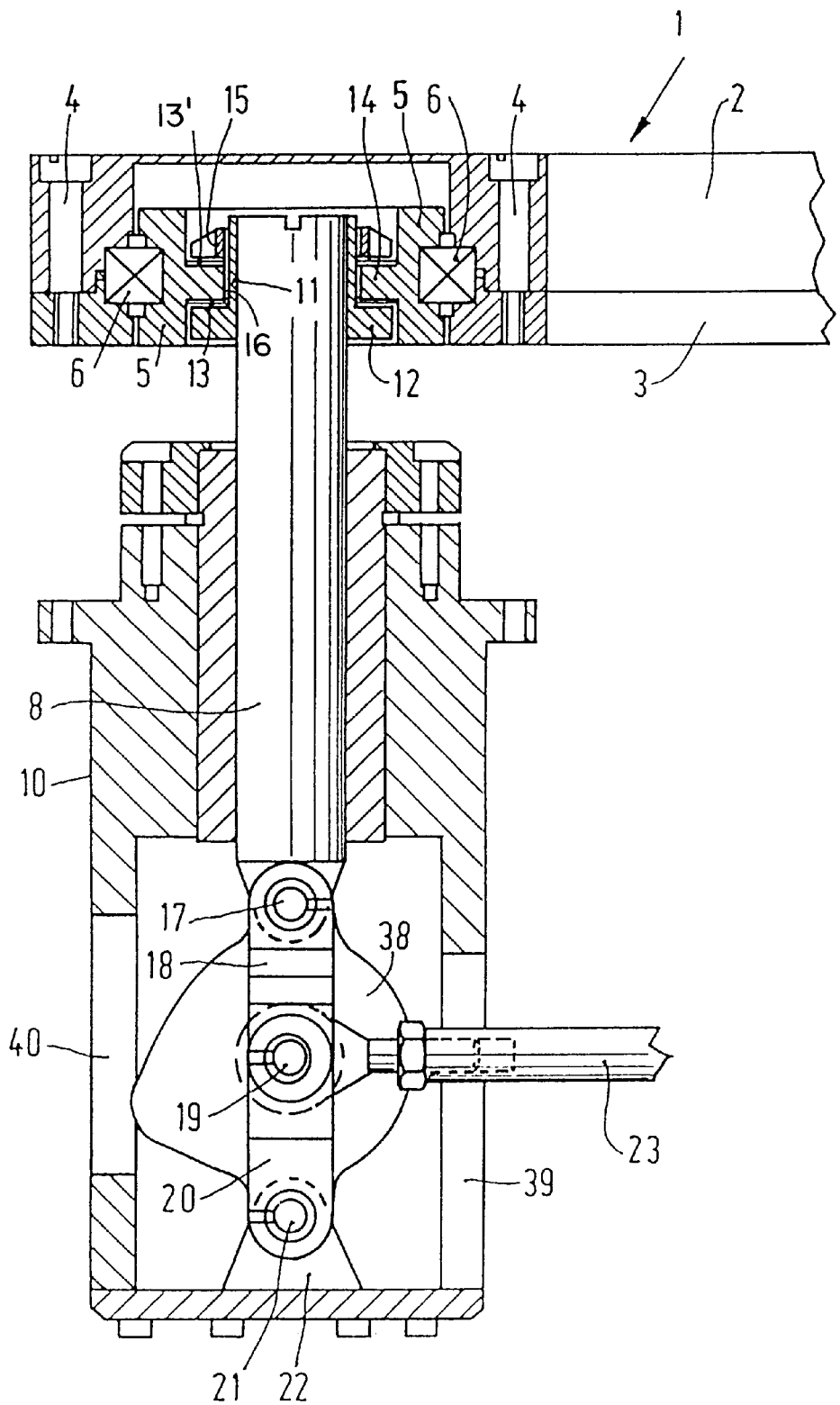
FIG. 4 is a larger-scale sectional view of a part of the transport means and the mechanism for reciprocating the transport means in vertical direction.
Figure 5:
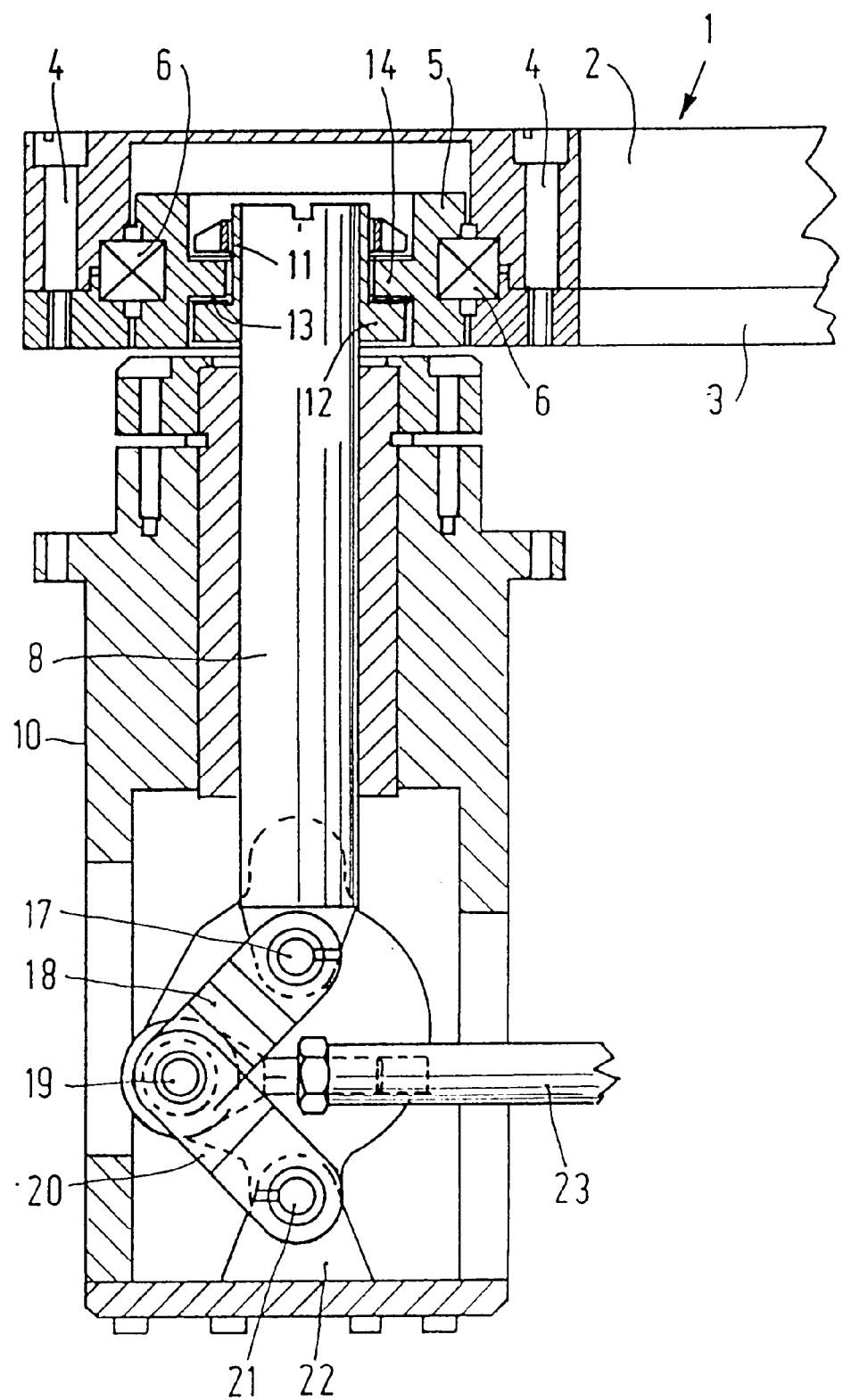
FIG. 5 is a view corresponding with FIG. 4, in a position in which the transport means has been moved downward in comparison with the position shown in FIG. 4.

As will furthermore be apparent from FIGS. 4 and 5, the wall of the sleeve 10 is formed with two diametrically opposed recesses 38, in order to obtain a compact construction of said sleeve, in which recesses the ends of pin 19 can move, and also with a recess 39 for allowing connecting rod 23 to pass. Furthermore a recess 40 is formed in the wall of sleeve 10, opposite recess 39, in order to prevent the wall of the sleeve 10 from coming into conflict with the links or the end of connecting rod 23 in the position illustrated in FIG. 5.

As is furthermore indicated in FIG. 1, the end of a connecting rod 42 of a preferably pneumatic buffer cylinder 43 may be secured to a support 41 secured to transport means 1, whilst said buffer cylinder is furthermore hinged to the frame of the device in a hinge point 44. The buffer cylinder 43 can be maintained at a desired pressure, so that a force, substantially in the direction according to arrow D, is constantly exerted on transport means 1 via connecting rod 42. As a result of this transport means 1 is constantly urged in a particular direction with respect to the carrier 5 rotatably supporting said transport means, as a result of which any backlash in the direction of rotation, for example caused by play in bearings 31 and 34, is compensated, in such a manner that any backlash that may be present will not have an adverse effect on the intended movements of transport means 1 about its axis of rotation. In order to effect this also other means, for example magnets, may be provided, which constantly attempt to urge the transport means in a particular direction with respect to the carrier.

Figure 6:
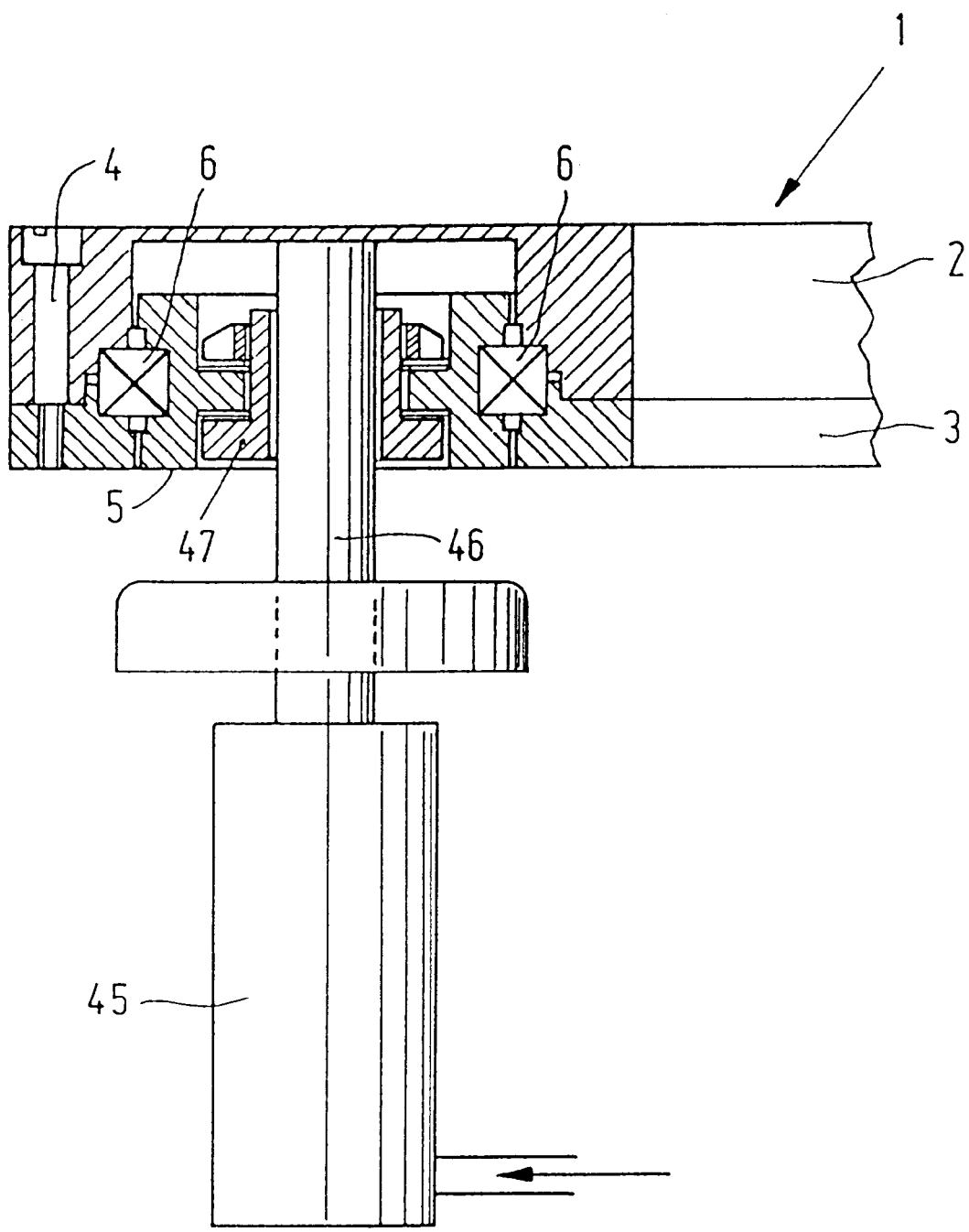
FIG. 6 shows the arrangement of a buffer cylinder supporting the transport means.

As is furthermore shown in particular in FIG. 6, carrier 5 may be supported by a few, preferably pneumatic, buffer cylinders 45, whose vertically extending piston rods 46 can freely slide through sleeves 47, which are of a similar design as sleeves 11 and which are secured to carrier 5 in a similar manner as sleeves 11. The upper ends of piston rods 46 butt against parts of transport means 1. It is also possible, however, to design the carrier with a closed underside near the buffer cylinders, whereby the upper ends of the piston rods or supporting parts provided on the upper ends of the piston rods can engage the underside of carrier 5.

When a certain pressure is maintained in the buffer cylinders 45, a upward force opposed to the force of gravity will be exerted on transport means 1. As a result of this the force which is to be exerted by means of plungers 8 so as to raise transport means 1 from the position shown in FIG. 5 to the position shown in FIG. 4 may be reduced, so that a comparatively low-power electromotor 28 may be utilized for moving connecting rods 23 in their longitudinal direction.

As is diagrammatically indicated in FIG. 1, said buffer cylinders are preferably disposed near plungers 8. Thus four plungers 8 and four buffer cylinders are used in the illustrated embodiment. It will be apparent that also other numbers of buffer cylinders and plungers may be used, and the number of buffer cylinders need not be the same as the number of plungers.

We claim:

1. A device for processing objects, said device being provided with a plurality of stations positioned relative to a conveying mechanism to allow movement of objects therebetween, each station including supporting means for supporting objects in said stations, and conveying means for moving objects from one of said plurality of stations to another one of said plurality of stations, whereby said conveying means include transport means capable of rotating about a vertical axis of rotation and movements parallel to said vertical axis of rotation, said transport means including gripping means for gripping and moving objects between said plurality of stations, and driving means for reciprocating said transport means about said vertical axis of rotation and translating said transport means parallel to said vertical axis of rotation so as to move said gripping means between said stations, wherein said transport means is supported by at least three spaced-apart carriers in such manner as to be rotatable about said vertical axis of rotation, each of said at least three carriers in turn being supported by a sliding piece movably mounted to a frame to be vertically movable relative thereto whereby first and second hinged-together links are provided between each said sliding piece and said frame, said first link being hinged to said sliding piece, said second link being hinged to said frame with both said first and second links being hinged to a connecting rod which is movable in a plane extending transversely to the axis of rotation, said first and second links being pivotal between a first position in which said first and second links define an angle relative to each other, and a second position in which said first and second links are at least substantially in line with said sliding piece.

2. A device according to claim 1, wherein said first and second links of each sliding piece are connected, by means of said connecting rods, to a mechanism capable of producing reciprocating rotation.

3. A device according to claim 2, characterized in that the axis of rotation of said means being capable of reciprocating rotation coincides with the axis of rotation of said transport means.

4. A device according to claim 1 wherein said driving means includes a crank connecting rod mechanism connected to said transport means for reciprocating said transport means about its axis of rotation.

5. A device according to claim 4, wherein said driving means comprises a motor rotating in one direction driving said crank connecting rod mechanism.

6. A device according to claim 1 herein said transport means is provided with two detachably interconnected annular parts, which define an annular space accommodating one of said at least three spaced-apart annular carriers annularly supported on the frame of the device.

7. A device according to claim 1, wherein said driving means includes means to rotate said transport means in a particular direction about its axis of rotation.

8. A device according to claim 1, wherein said driving means includes means for exerting an upward force on said at least three spaced apart carriers supporting said transport means.

9. A device according to claim 1 wherein said transport means is provided with two detachably interconnected annular parts, which define an annular space therebetween.

* * * * *